United States Patent
Sujan

(10) Patent No.: US 12,179,633 B2
(45) Date of Patent: Dec. 31, 2024

(54) FUEL CELL SYSTEM POWER-SPLIT CONTROL FOR COMPONENT DURABILITY MANAGEMENT

(71) Applicant: UT-Battelle, LLC, Oak Ridge, TN (US)

(72) Inventor: Vivek Sujan, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 18/367,054

(22) Filed: Sep. 12, 2023

(65) Prior Publication Data

US 2024/0092225 A1 Mar. 21, 2024

Related U.S. Application Data

(60) Provisional application No. 63/408,557, filed on Sep. 21, 2022.

(51) Int. Cl.
| | |
|---|---|
| *B60L 58/40* | (2019.01) |
| *B60L 3/00* | (2019.01) |
| *B60L 50/75* | (2019.01) |
| *B60L 58/13* | (2019.01) |
| *B60L 58/16* | (2019.01) |
| *B60W 20/13* | (2016.01) |

(52) U.S. Cl.
CPC ............ *B60L 58/40* (2019.02); *B60L 3/0053* (2013.01); *B60L 50/75* (2019.02); *B60L 58/13* (2019.02); *B60L 58/16* (2019.02); *B60W 20/13* (2016.01)

(58) Field of Classification Search
CPC .......... B60L 58/40; B60L 58/16; B60L 50/75; B60L 58/13; B60L 3/00; B60L 3/0053; B60W 20/13
See application file for complete search history.

(56) References Cited

PUBLICATIONS

Bizon, N., "Real-Time Optimization Strategy for Fuel Cell Hybrid Power Sources with Load-Following Control of the Fuel or Air Flow," Energy Convers. Manag. 157 (2018): 13-27.
De Boera, P.C.T., McLeana, W.J., and Homana, H.S., "Performance and Emissions of Hydrogen Fueled Internal Combustion Engines," International Journal of Hydrogen Energy 1, No. 2 (1976): 153-172.
(Continued)

*Primary Examiner* — Robert L Deberadinis
(74) *Attorney, Agent, or Firm* — WARNER NORCROSS + JUDD LLP

(57) ABSTRACT

An improved power-split control system for managing a load profile of a fuel cell in a fuel cell electric vehicle (FCEV) is provided. The power-split control system is operable to actively manage the power demand between the fuel cell and the battery of a FCEV to optimize the operational life of the fuel cell. The power-split control system can use information gathered solely from historical drive cycle data or from historical drive cycle data combined with look-ahead eHorizon data. The power-split control system meets a power demand by operating the powertrain in either a battery charge sustaining mode or a battery charge depletion mode. The power-split control system is also configured to control the power distribution (to the electric motor) from the fuel cell and the battery in a manner that minimizes the degradation of the fuel cell.

22 Claims, 8 Drawing Sheets

(56) References Cited

PUBLICATIONS

Kircher, O., Greim, G., Burtscher, J., and Brunner, T. "Validation of Cryo-compressed Hydrogen Storage (CcH2)—A Probabilistic Approach," in Proceedings of the 4th International Conference on Hydrogen Safety, ICHS 2011, Brussels, 2011.

Kobayashi, H., Hayakawa, A., Somarathne, K., Don, K. et al., "Science and Technology of Ammonia Combustion," Proceedings of the Combustion Institute 37, No. 1 (2019): 109-133.

Marzougui, H., Amari, M., Kadri, A., Bacha, F. et al., "Energy Management of Fuel Cell/Battery/Ultracapacitor in Electrical Hybrid Vehicle," Int. J. Hydrogen Energy 42 (2017): 8857-8869.

Zhang, R., Xia, B., Li, B., Cao, L. et al., "State of the Art of Lithium-Ion Battery SOC Estimation for Electrical Vehicles," Energies 2018, No. 11 (2018): 1820.

FUEL CELL SYSTEM POWER-SPLIT CONTROL FOR COMPONENT DURABILITY MANAGEMENT

CROSS-REFERENCE TO RELATED APPLICATIONS

This application claims the benefit of U.S. Provisional Application 63/408,557, filed Sep. 21, 2022, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to fuel cell electric vehicles, and in particular, the management and distribution of power from a fuel cell and a battery of a fuel cell electric vehicle.

BACKGROUND OF THE INVENTION

A fuel cell electric vehicle (FCEV) is an environmentally friendly vehicle that uses a fuel cell and a battery to power an electric motor. The most common fuel cell is a hydrogen fuel cell that uses hydrogen gas and oxygen from the air to generate electricity through an electrochemical reaction. The electric current produced by the fuel cell powers an electric motor, which provides propulsion. The onboard battery stores excess energy generated by the fuel cell during periods of low power demand. The battery can also supply additional power during acceleration or other high-demand scenarios, enhancing the overall performance of the FCEV.

FCEVs are favored over internal combustion engines because they emit only water vapor and trace amounts of other byproducts. Additionally, FCEVs offer several benefits over battery electric vehicles, including faster refueling times and longer driving ranges. FCEVs generally include a powertrain that is similar in many respects to a hybrid electric powertrain, except that the fuel cell and an associated DC/DC converter replaces a conventional internal combustion engine. A further difference is the impact of the power load on the life of the fuel cell. Unlike diesel or gasoline engines, fuel cells see significant life or durability impact based on the load profile. Thus, additional controls are needed to support FCEV powertrains.

Several companies have developed FCEV solutions for commercial vehicles. These include Cummins, Nikola, Hyundai, Toyota, PACCAR, Navistar, and others. In addition, there is ample academic literature for fuel cell controls. However, the industry as a whole has limited experience in characterizing and managing fuel cell life. Accordingly, there remains a continued need for the improved management of fuel cells for FCEV powertrains, and in particular, systems and methods that meaningfully extend the service life of fuel cells in FCEVs.

SUMMARY OF THE INVENTION

A power-split control system for managing a load profile of a fuel cell in a FCEV is provided. The power-split control system is operable to actively manage the power demand between the fuel cell and the traction battery of a FCEV to optimize the operational life of the fuel cell. The power-split control system can use information gathered solely from historical drive cycle data or from historical drive cycle data combined with look-ahead eHorizon data.

The power-split control system meets a power demand by operating the powertrain in either a battery charge sustaining mode or a battery charge depletion mode. In the battery charge sustaining mode, a state of charge at the end of the drive cycle matches the state of charge at the beginning of the drive cycle. In the battery charge depletion mode, the state of charge at the end of the drive cycle is lower than the state of charge at the beginning of the drive cycle. The power-split control system is also configured to control the power distribution (to the electric motor) from the fuel cell and the battery in a manner that minimizes the degradation of the fuel cell.

In one embodiment, the power-split control system includes a controller configured to manage charge sustaining requirements for the battery and concurrently drive the fuel cell to the region of greatest life. In a first phase of operation, the controller adjusts the power supplied by the fuel cell to pull the battery state-of-charge back towards a nominal state of charge that is defined at the start of the drive cycle. The controller continuously monitors the average power demand of the electric motor and, using this information, sets the average power demand for the fuel cell over the drive cycle. In a second phase of operation, the controller provides life management while achieving battery charge sustainment. During this phase, the battery experiences increased levels of throughput since the fuel cell power output is no longer only dependent upon the power demand from the operator. The controller maintains the fuel cell at more of an average operating condition for longer time periods.

The power-split control system provides a continuous dynamic domain solution for commercial and passenger FCEVs by operating the fuel cell at a few discrete load points that have been selected to support more steady state operations, which also help with fuel cell life. The stochastic controller reduces the degradation of the hydrogen fuel cell over conventional controllers that are based solely on load following strategies. While the above embodiments prioritize the operational life of the fuel cell over the traction battery, in alternative embodiments the power-split control system can favor the traction battery at the expense of the operational life of the fuel cell, while in still other embodiments the fuel cell and the traction battery can be operated with the goal of preserving their operational lives equally.

These and other features and advantages of the present invention will become apparent from the following description of the invention, when viewed in accordance with the accompanying drawings and appended claims.

DETAILED DESCRIPTION OF THE CURRENT EMBODIMENT

The current embodiment relates to a power-split control system for managing a load profile of a fuel cell in a FCEV. The power-split control system is operable to actively manage the power demand between the fuel cell and the battery of a FCEV to optimize the operational life of the fuel cell. Before the power-split control system is discussed, a non-limiting example of a FCEV is discussed below in connection with FIG. 1.

Figure 1:
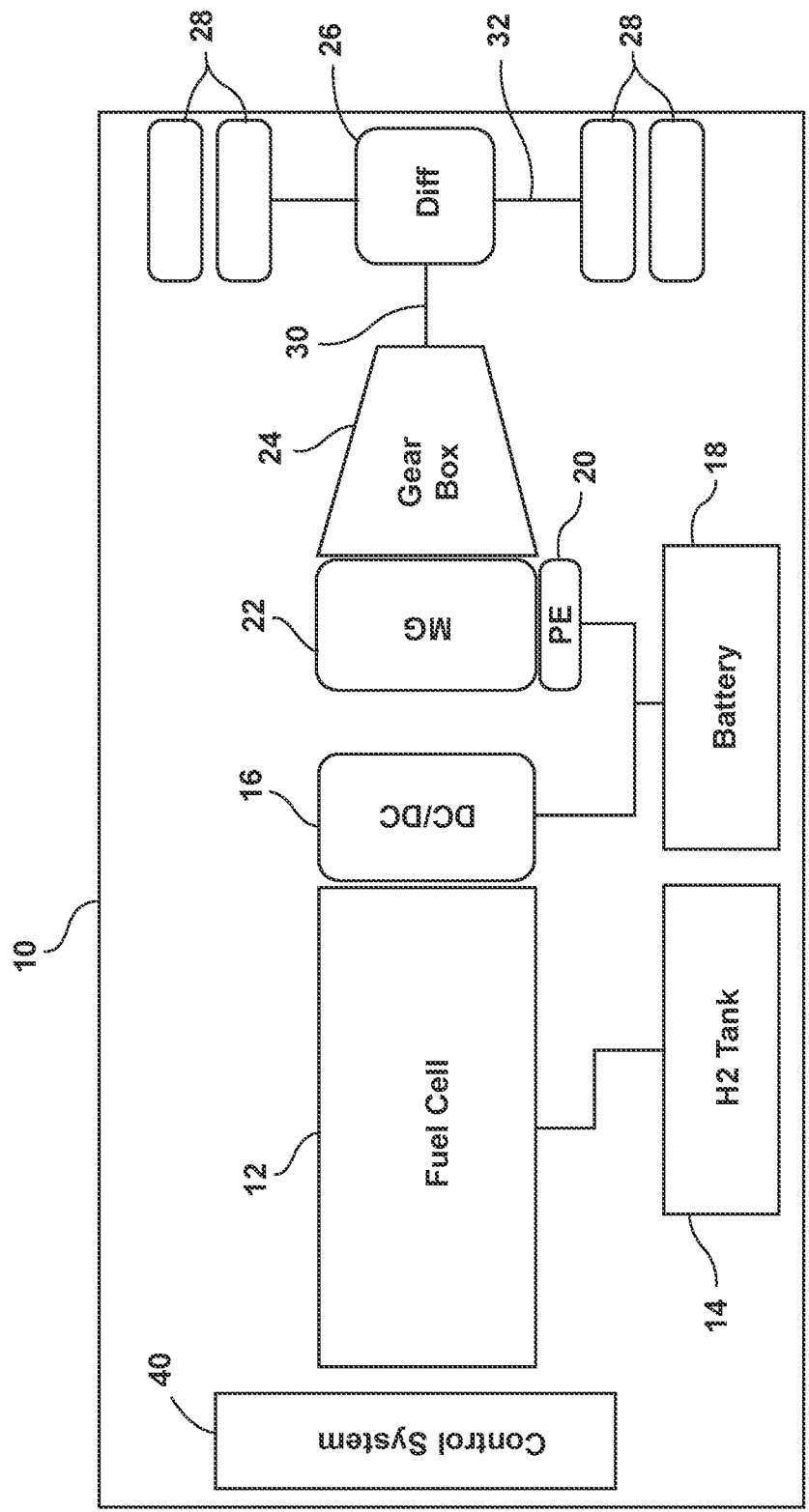
FIG. 1 is a schematic diagram of a fuel cell electric vehicle in accordance with one embodiment of the present invention.

In particular, the FCEV of FIG. 1 is generally designated 10 and includes a fuel cell stack 12, a hydrogen storage tank 14, a power converter 16, a traction battery 18, power electronics 20, a motor-generator 22, a gear box 24, a differential 26, and at least one axle 26 for providing a driving torque to vehicle wheels 28. The fuel stack 12 can include multiple individual fuel cells stacked together. The fuel cells can each contain an anode and a cathode separated by a proton exchange membrane (PEM). Hydrogen gas is fed to the anode from the hydrogen storage tank 14, and oxygen from the air is supplied to the cathode. The resulting electrochemical reaction within the fuel cells generates an electrical voltage, which is output to the converter 16. The converter 16 is generally a DC/DC converter for providing a regulated DC output to either or both of the traction battery 18 and the power electronics 20. The traction battery 18 provides additional power during acceleration and helps manage power demand variations as more specifically set forth below. The power electronics 20 includes an inverter for converting a DC input into an AC output for the motor-generator 22. The electric motor 22, in turn, drives an output shaft 30 which is coupled to a drive axle 32 via the differential 26 for providing a motive force to the FCEV 10.

Figure 2:
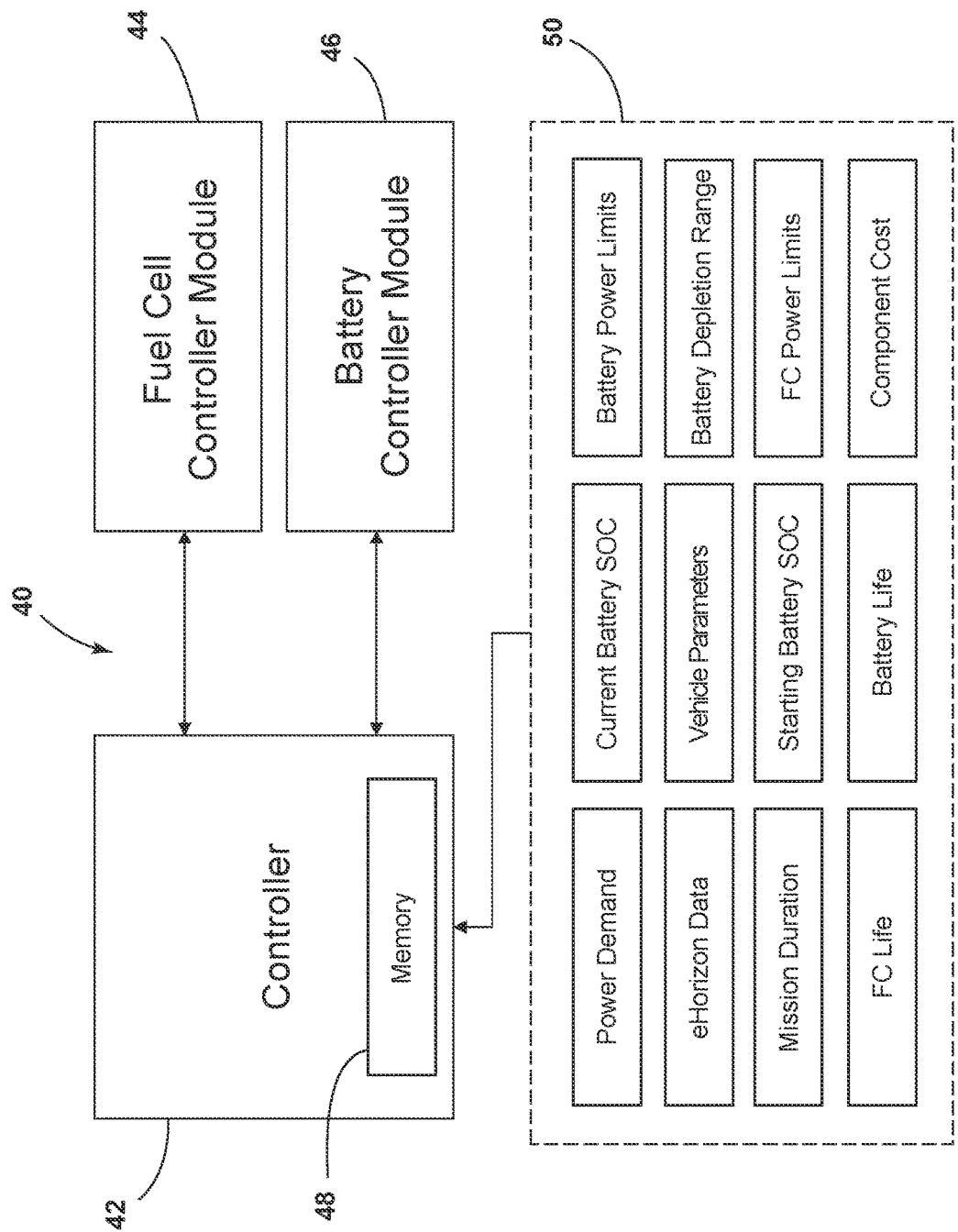
FIG. 2 is a block diagram of power-split control system for managing a load profile of the fuel cell electric vehicle of FIG. 1.

Referring now to FIG. 2, the FCEV 10 includes a power-split control system 40 that is operable to allocate the electrical power output from the fuel cell 12 and the traction battery 18. The power-split control system 40 includes a controller 42, a fuel cell controller module 44, and a battery controller module 46. The controller 42 can be implemented as a microprocessor, an FPGA, or an ASIC, and is optionally a stochastic controller and is communicatively coupled to each of the fuel cell module 44 and the battery controller module 46. The controller 42 includes machine readable memory 48 with instructions that, when executed, cause the controller 42 to control operation of each module 44, 46. As discussed below, the controller 42 can accept a variety of inputs 50, including by non-limiting example power demand, the current battery state of charge (SOC), battery power limits, eHorizon data, vehicle parameters, battery depletion range, mission duration, starting battery SOC, fuel cell power limits, fuel cell life, battery life, and component cost (e.g., battery component cost or fuel cell component cost).

Figure 3:
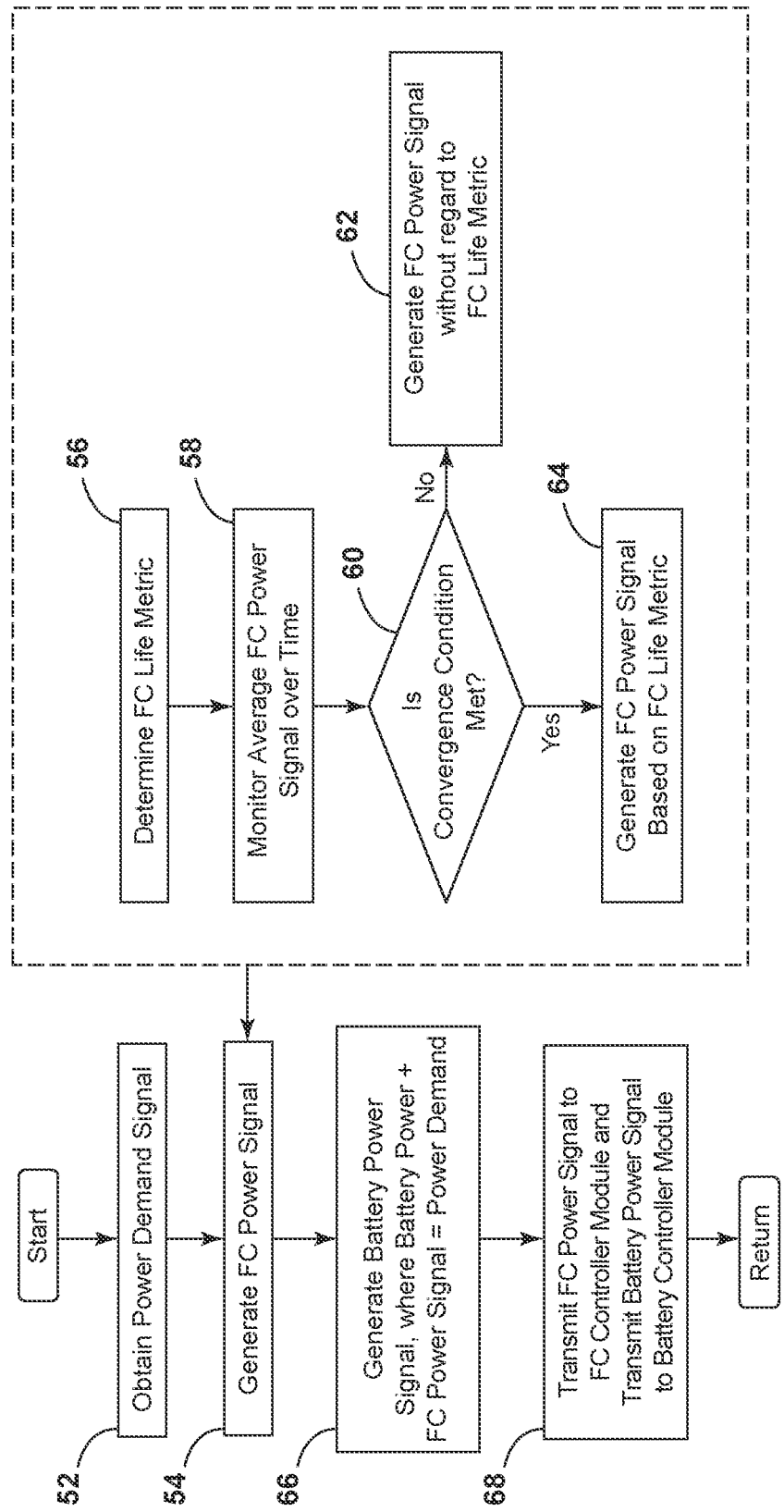
FIG. 3 is a flow chart illustrating a method of operation for the power-split control system illustrated in FIG. 2.

Referring now to FIG. 3, a flow chart illustrating a method of operation for the power-split control system 40 will now be described. At step 52, the controller 42 obtains a power demand signal that is representative of the instantaneous power demand of the FCEV 10. The power demand signal can be based on a variety of factors, including the driver's accelerator pedal input and the vehicle's speed. At step 54, the controller 42 generates a fuel cell power signal. As depicted at right in FIG. 3, this step includes determining a fuel cell life metric at step 56. The fuel cell life metric can include, by non-limiting example, the loading fraction of the fuel cell 12. The loading fraction can be a numerical valve expressed as the actual power output of the fuel cell divided by the rated power output of the fuel cell 12. Optionally, the loading fraction can vary over the life of the fuel cell 12. To account for this change, the fuel cell controller module 44 can monitor the loading faction (or other fuel cell metric) over the life of the fuel cell 12.

Figure 4:
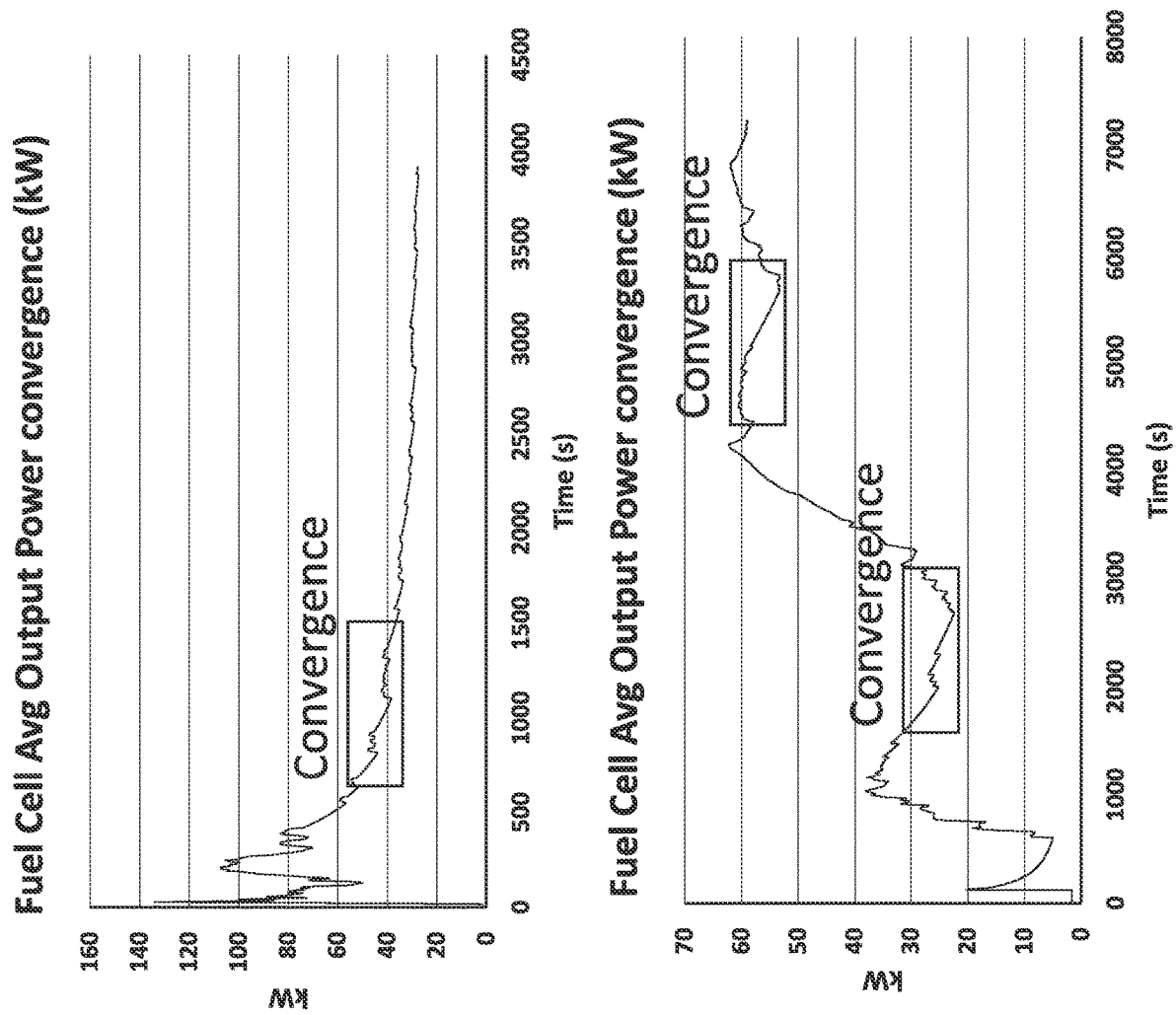
FIG. 4 includes graphs that illustrate the fuel cell average output as a function of time for different drive cycles, including urban haul and regional haul.
Figure 5:
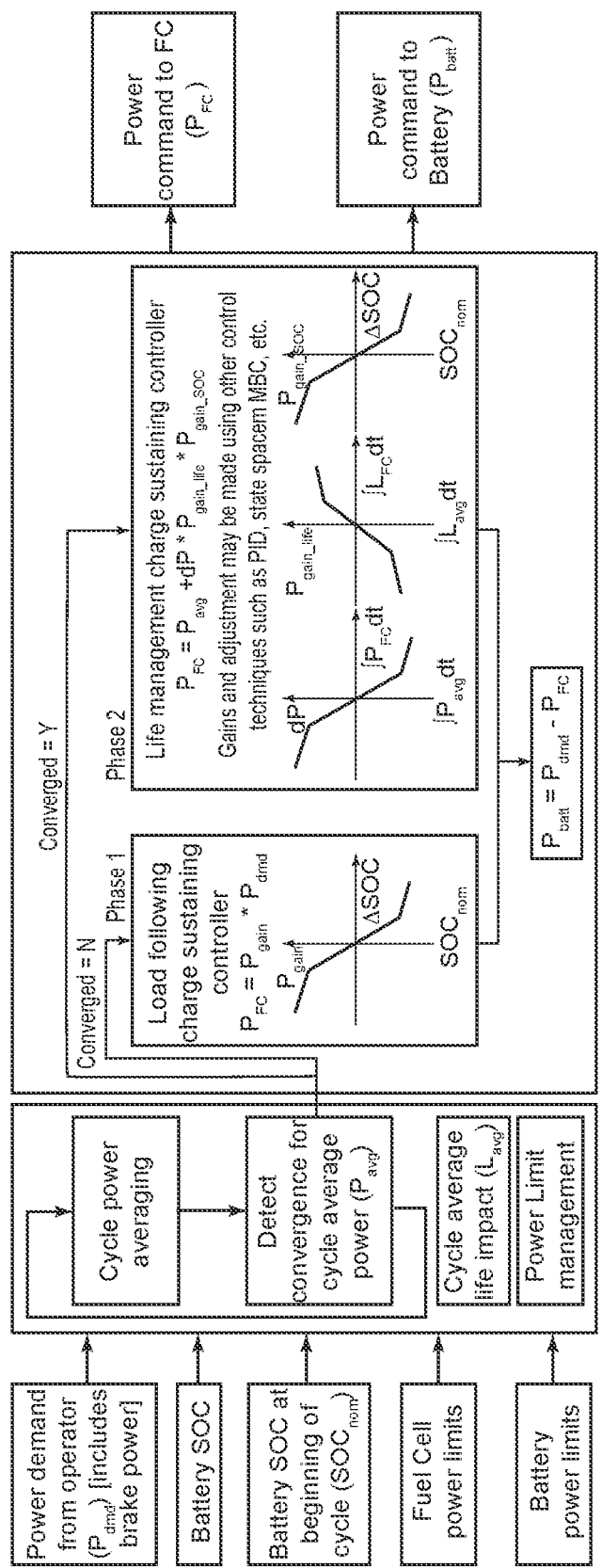
FIG. 5 illustrates a control methodology for the power-split control system of FIG. 2 using only historical drive cycle data.

At step 58, the controller 42 monitors the fuel cell power signal over time. The power output of the fuel cell 12 can vary over time, particularly in response to a change in power demand. At decision step 60, the controller 42 determines whether the average power output of the fuel cell 12 has reached a convergence condition. As used herein, a "convergence condition" occurs when a measured value approaches a steady state condition, within upper and lower bounds. As shown in FIG. 5 (top graph) for example, the average power output of the fuel cell (as the measured value) approaches a steady state condition of approximately 40 kW from 700 seconds to 1500 seconds. As also shown in FIG. 4 (bottom graph), the average power output of the fuel cell approaches a steady state condition of approximately 26 kW from 1800 seconds to 3000 seconds and at 56 kW from 4500 seconds to 6000 seconds. If the convergence condition is not yet met, the controller 42 generates a fuel cell power signal without regard to the fuel cell life metric at step 62, effectively operating the FCEV in a charge sustaining mode, in which the battery SOC at the end of the drive cycle matches the battery SOC at the beginning of the drive cycle. If however the convergence condition is met, the controller generates a fuel cell power signal based, at least in part, on the fuel cell life metric at step 64, effectively operating the FCEV in a charge depletion mode, in which the battery SOC at the end of the drive cycle is less than the battery SOC at the beginning of the drive cycle. At step 66, the controller 42 generates a battery power signal. The battery power signal is equal to the power demand less the fuel cell power signal. At step 68, the controller 42 transmits the fuel cell power signal to the fuel cell controller module 44 and transmits the battery power signal to the battery controller module 46. The foregoing method is repeatedly executed by the controller 42 during operation of the FCEV 10.

To reiterate, the controller provides charge sustaining while the average cycle load is determined. During the charge sustaining mode of operation, the fuel cell power demand is adjusted to pull the battery SOC back towards a nominal SOC that is defined as the battery SOC at the start of the drive cycle. This is achieved based on a power gain that is determined based on the deviation of the SOC from the nominal target value. When the controller detects that the measured power output of the fuel cell has converged on the drive cycle average fuel cell power demand, the controller switches operation to the charge depletion mode of operation. In the charge depletion mode of operation, the battery SOC at the end of the drive cycle is less than the battery SOC at the beginning of the drive cycle.

Referring now to FIG. 5, operation of the controller 42 in the charge sustaining and charge depletion modes of operation is further illustrated. The power demand, instantaneous battery SOC, beginning battery SOC, fuel cell power limits, and battery power limits are accessible to the controller 42 when monitoring the fuel cell power output. When a convergence condition is not yet detected, the controller 42 operates in a load following (charge sustaining) mode. In this mode, the controller 42 determines the power output of the fuel cell ($P_{FC}$) based solely on the power demand ($P_{dmd}$) and a gain function ($P_{gain}$). The gain varies as a function of battery SOC. As the battery SOC increases from nominal ($SOC_{nom}$), the gain ($P_{gain}$) decreases, thereby reducing the power output of the fuel cell ($P_{FC}$). As the battery SOC decreases from nominal ($SOC_{nom}$), the gain ($P_{gain}$) increases, thereby increasing the power output of the fuel cell ($P_{FC}$). The controller then determines the power output of the battery ($P_{batt}$) as the differences between the power demand ($P_{dmd}$) and the power output of the fuel cell ($P_{FC}$). The corresponding control signals are then output to the battery controller module 46 and the fuel cell controller module 44.

When a convergence condition is met, the controller 42 operates in a life management (charge depletion) mode. In this mode, the controller 42 determines the power output of the fuel cell ($P_{FC}$) based on additional factors. These additional factors can include the average power output of the fuel cell after convergence ($P_{avg}$), the difference between the power demand and the measured power output of the fuel cell (dP), a first gain function ($P_{gain\_life}$), and a second gain function ($P_{gain\_SOC}$). The value dP is a function of the integral of the average power output of the fuel cell over time. The first gain function ($P_{gain\_life}$) provides a gain value as a function of the integral of a life function $L_{FC}$, which represents the degradation of the fuel cell 12 over time. The second gain function ($P_{gain\_SOC}$) provides a gain value as a function of the battery SOC, in the same respect as in the load following mode of operation. Once these values are determined, the controller 42 calculates a desired power output of the fuel cell ($P_{FC}$) and calculates the power output of the battery ($P_{batt}$) as the differences between the power demand ($P_{dmd}$) and the power output of the fuel cell ($P_{FC}$). The corresponding control signals are then output to the battery controller module 46 and the fuel cell controller module 44 for operation of the FCEV 10.

Figure 6:
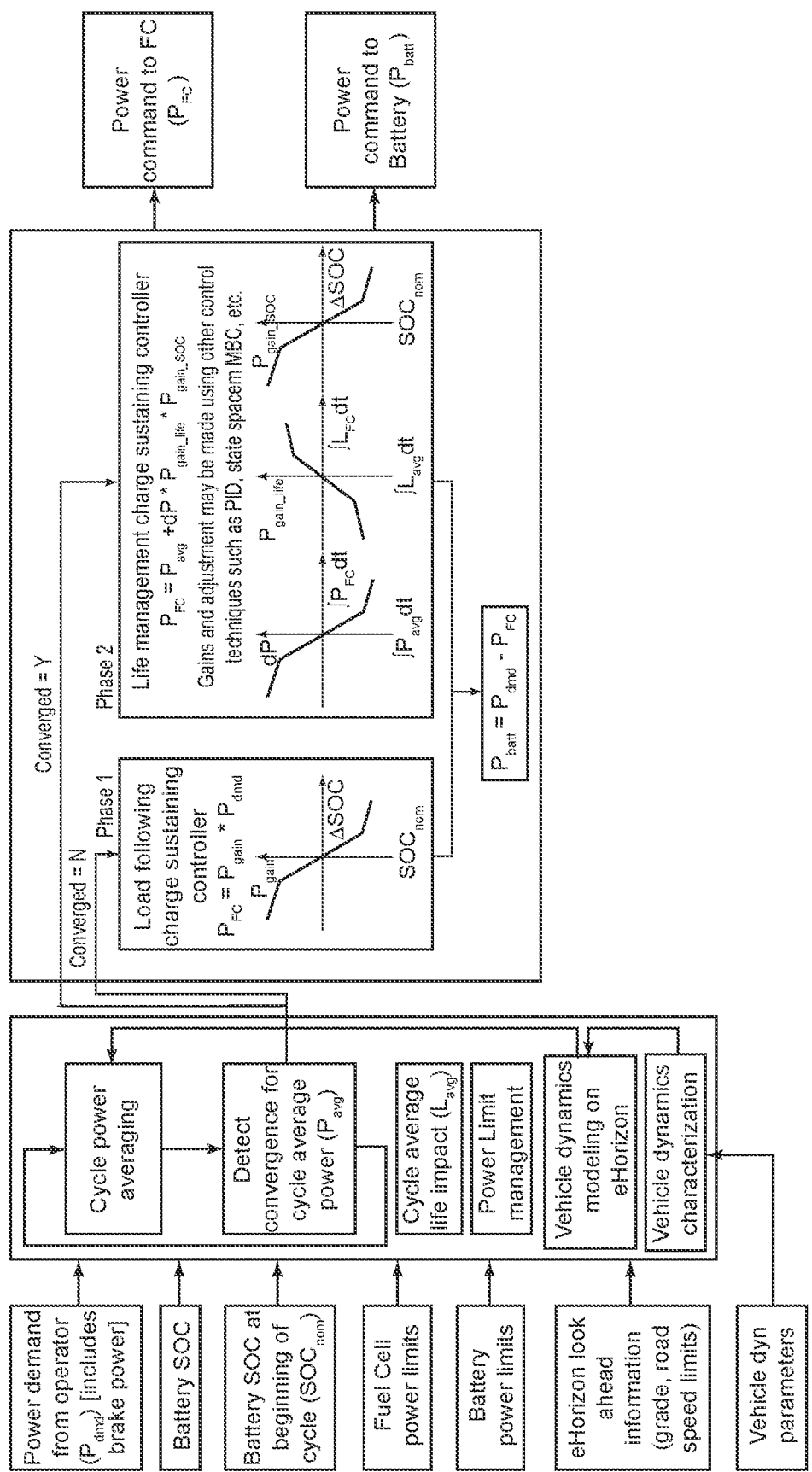
FIG. 6 illustrates a control methodology for the power-split control system of FIG. 2 using both historical drive cycle data and look ahead eHorizon data.

As optionally shown in FIG. 6, the controller 42 can use both historical drive cycle data as well as look-ahead eHorizon data. In this configuration, the controller 42 operates in a load following (charge sustaining) mode substantially as described above in connection with FIG. 5. In addition, here the controller uses eHorizon information to help characterize the upcoming load demand and factor the upcoming load demand into the assessment of the convergence of the cycle average power demand. Depending on the length of the eHorizon, the controller may not need to dwell in the load following (charge sustaining) mode very long and may be able to provide the information for the life management (charge depletion) mode very rapidly. Here, an estimation of the vehicle load uses not only the eHorizon information, but also data about vehicle dynamics parameters such as mass, coefficient of drag ($C_d$), coefficient of rolling resistance ($C_{rr}$), and other losses. In the load following (charge sustaining) mode, the controller provides life management for the fuel cell 12 while achieving a charge sustaining solution for the traction battery 18 by driving the fuel cell power output ($P_{FC}$) towards the drive cycle average power demand ($P_{avg}$).

Figure 7:
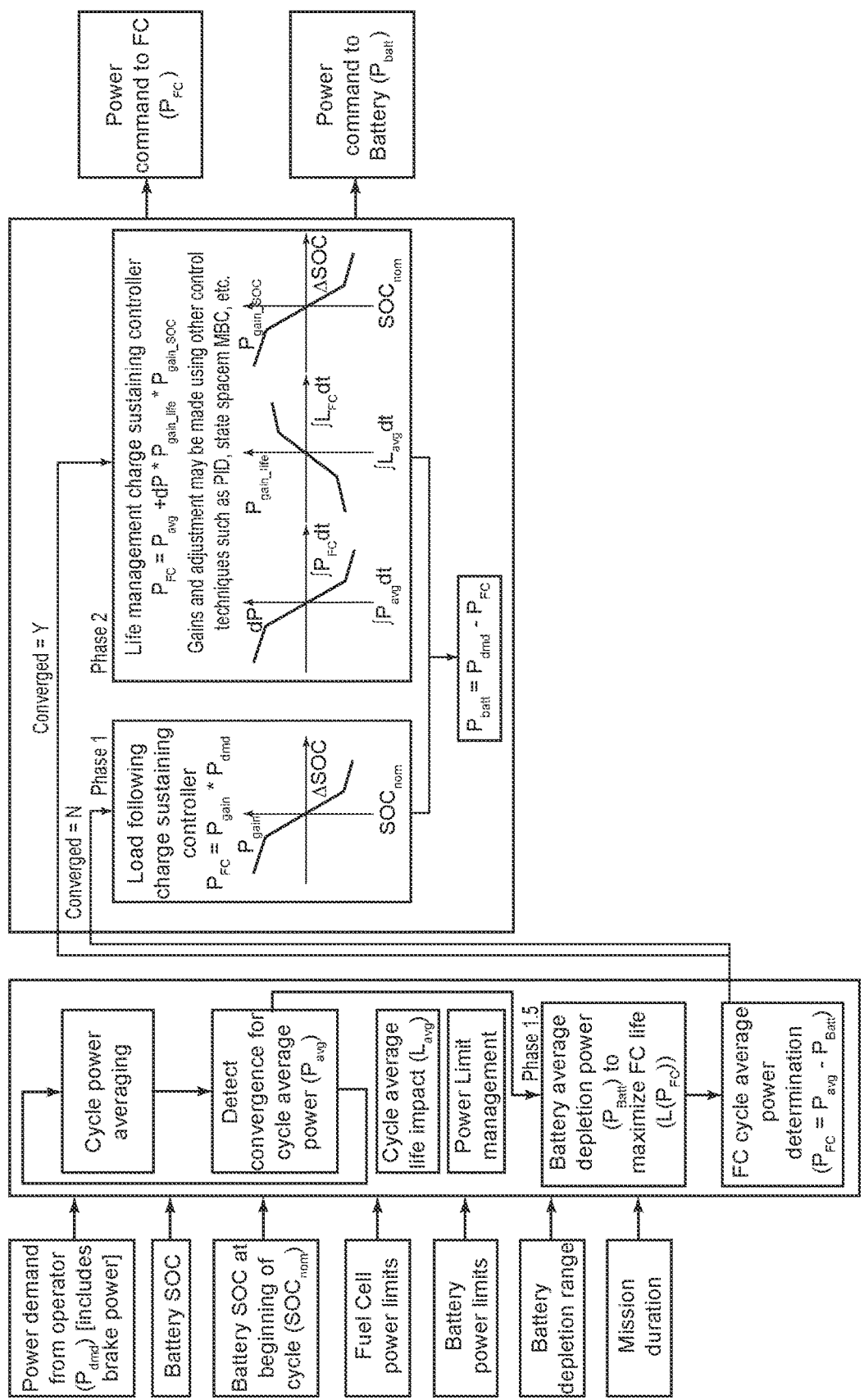
FIG. 7 illustrates a further control methodology for the power-split control system of FIG. 2 using only historical drive cycle data.

As optionally shown in FIG. 7, the controller 42 may additionally factor in the battery depletion range and the mission duration. The controller 42 can provide optimal battery charge depletion control, so that the fuel cell life is maximized. Operation of this implementation of the controller 42 has three phases. The first and last phases (phase 1 and phase 2) correspond to the load following (charge sustaining) mode and the life management (charge depletion) mode described above in connection with FIG. 5. The controller 42 includes an intermediate phase, labeled phase 1.5 in FIG. 7. This phase 1.5 is performed by the controller 42 while the phase 1 is in progress, that is, during periods of non-convergence. In phase 1.5, the controller 42 is conducting a system identification to determine the ideal battery charge depletion trajectory so that the impact to the fuel cell life is minimized. In this manner, the battery discharge power and state of charge trajectory can be delimited between an upper limit and a lower limit. The upper limit is based on the phase 1 average cycle power, which represents the cycle average power demand. In this limit, the traction battery generates the full wheel power demand until it exhausts its energy capacity, after which the fuel cell takes over and produces the full wheel power demand while charge sustaining the battery at its lower state of charge limit. The lower limit for the battery is based on depleting the battery completely to its lower state of charge limit smoothly and continuously for the total drive cycle time. The controller determines a single parameter optimization on battery power, $P_{Batt}$, between the upper and lower limits in order to then determine the average fuel cell power demand, so that the fuel cell life function is least impacted.

Once an optimum average battery power $P_{Batt}$ is identified, the average fuel cell power output ($P_{FC}$) can be identified for the life management (charge depletion) mode, illustrated as phase 2 in FIG. 7. In the life management (charge depletion) mode, the controller drives the fuel cell power output toward a cycle average fuel cell power demand while achieving a battery charge depletion solution. The cycle average fuel cell power demand is the cycle average power demand minus the power produced by the charge depleting battery, and the battery charge depletion solution is achieved using a power adjustment function.

Figure 8:
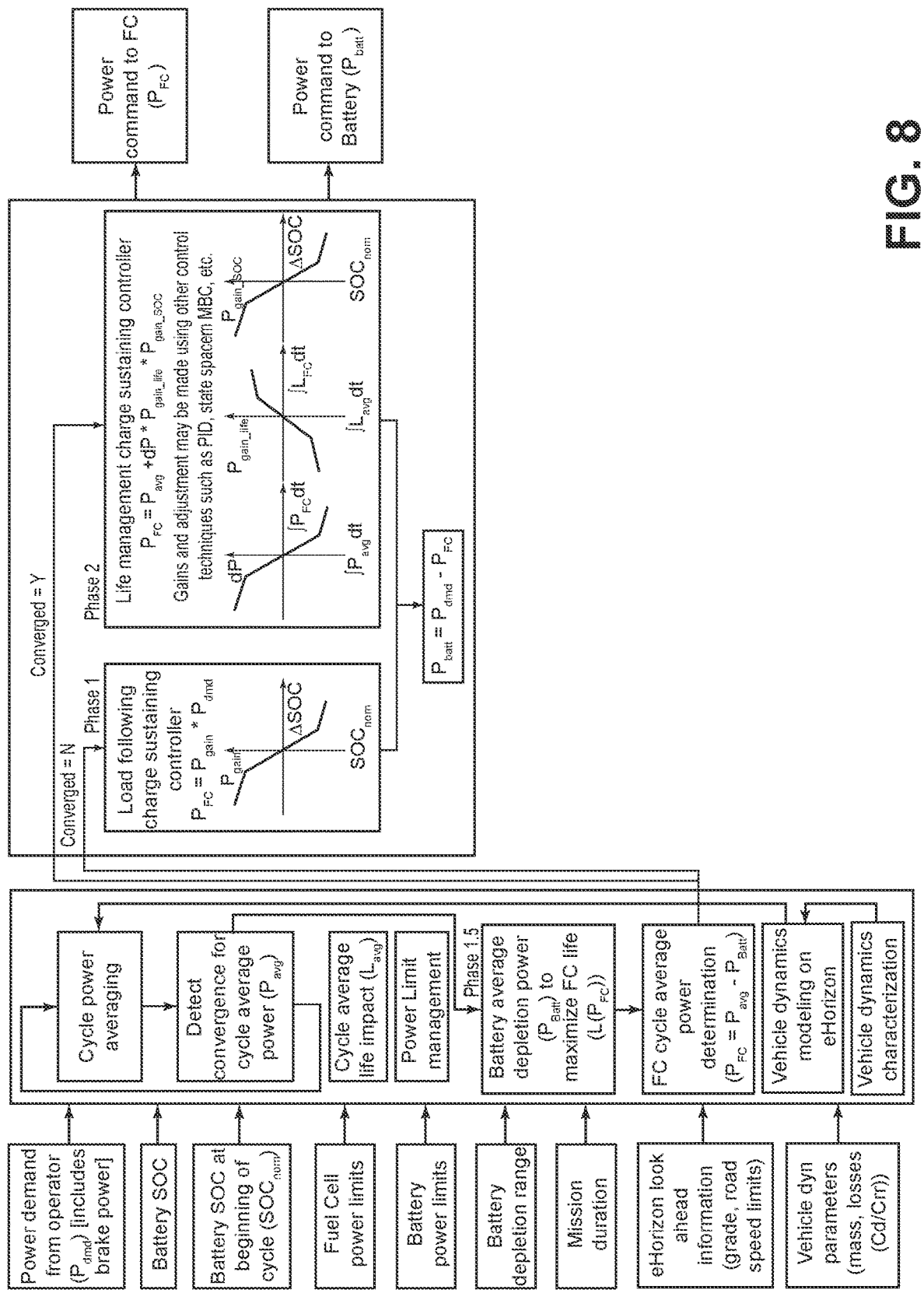
FIG. 8 illustrates a further control methodology for the power-split control system of FIG. 2 using both historical drive cycle data and look ahead eHorizon data.

As optionally shown in FIG. 8, the controller 42 uses both historical drive cycle data and look ahead eHorizon data. This implementation is essentially a combination of the implementation of FIG. 6 and of FIG. 7. More specifically, the controller 42 operates in a load following (phase 1) mode substantially as described above in connection with FIG. 5. The controller 42 uses eHorizon data to help characterize the upcoming load demand and to factor the upcoming load demand into the assessment of the convergence of the cycle average power demand. The estimation of the vehicle load uses not only eHorizon information but will also use knowledge of vehicle dynamics parameters such as mass, $C_d$, $C_{rr}$, and other losses.

To reiterate, the fuel cell 12 generally provides a continuous and efficient source of power, particularly during steady state operation, while the traction battery 18 offers high power density and the ability to handle transient loads. By efficiently managing the power flow between the fuel cell 12 and the traction battery 18, power-split control can maximize the energy efficiency of the FCEV 10 and enhance the service life of the fuel cell 14. The controller 42 is optionally a stochastic controller that provides robust and adaptive control strategies for the FCEV powertrain by incorporating uncertainty and randomness into its decision-making logic in at least two phases. In the first phase of operation, the controller 42 adjusts the power supplied by the fuel cell 12 to pull the battery state-of-charge back towards a nominal state of charge that is defined at the start of the drive cycle. In the second phase of operation, the controller 42 provides life management while achieving battery charge sustainment. During this phase, the traction battery 18 experiences increased levels of throughput since the fuel cell power is no longer only dependent upon the power demand from the operator. The controller 42 maintains the fuel cell 12 at more of an average operating condition for longer time periods, thereby extending the life of the fuel cell 12.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A system for operating a powertrain of a vehicle, wherein the powertrain includes a fuel cell and a traction battery, the system comprising:
    a controller communicatively coupled to a fuel cell controller module and a battery controller module;
    wherein the controller is configured to:
        obtain a power demand based at least in part on input from a user of the vehicle, a signal indicative of a state-of-charge of the traction battery, information about a characteristic of the traction battery, and information about a characteristic of the fuel cell,
        produce a fuel cell power signal that indicates a power to be output by the fuel cell and a battery power signal that indicates a power to be output by the traction battery, such that the power to be output by the fuel cell and the power to be output by the traction battery together add up to the power demand obtained by the controller,
        transmit the fuel cell power signal to the fuel cell controller module to cause the fuel cell to provide to the powertrain a corresponding fuel cell power, and
        transmit the battery power signal to the battery controller module to cause the traction battery to provide to the powertrain a corresponding battery power;
    wherein, to produce the fuel cell power signal, the controller is configured to determine a fuel cell life metric based at least in part on the characteristic of the fuel cell.

2. The system of claim 1, wherein, to produce the fuel cell power signal, the controller is further configured to:
    monitor an average of the fuel cell power signal over time and detect whether the average of the fuel cell power signal has achieved a convergence condition; and
    in response to the average of the fuel cell power signal achieving a convergence condition, determine the fuel cell power signal, wherein the fuel cell power signal is determined based at least in part on the fuel cell life metric, the state-of-charge of the traction battery, and the characteristic of the traction battery.

3. The system of claim 2, wherein the controller is configured to:
    receive eHorizon information; and
    if the monitored average of the fuel cell power signal has not achieved a convergence condition, determine the fuel cell power signal based at least in part on the power demand signal, the eHorizon information, and a vehicle dynamics parameter including at least one of mass, coefficient of drag, and coefficient of rolling resistance.

4. The system of claim 3, wherein the controller is configured to produce the fuel cell power signal to respond to the combination of the power demand signal, the eHorizon information, and the vehicle dynamics parameter.

5. The system of claim 1, wherein to produce the fuel cell power signal, the controller is configured to:
    if the monitored average of the fuel cell power signal has not achieved a convergence condition, determine the fuel cell power signal based at least in part on the state-of-charge of the battery without regard to the fuel cell life metric.

6. The system of claim 1, wherein the controller is configured to determine the fuel cell power signal to maximize the operational life of the fuel cell while sustaining the charge of the battery.

7. The system of claim 6, wherein the controller is configured to determine the fuel cell power signal.

8. The system of claim 1, wherein the controller is configured to:
    receive information about battery charge depletion range and mission duration;
    determine a battery charge depletion trajectory over the battery charge depletion range and for the mission duration to maximize the fuel cell's operational life; and
    generate the fuel cell power signal to maximize the operational life of the fuel cell while depleting the battery charge.

9. The system of claim 8, wherein the controller is configured to generate the fuel cell power signal.

10. The system of claim 8, wherein the controller is configured to determine the battery charge depletion trajectory.

11. The system of claim 8, wherein the controller is configured to determine the battery charge depletion trajectory to include a battery charge sustaining portion followed by a battery charge depletion portion or to include a battery charge depletion portion followed by a battery charge sustaining portion.

12. The system of claim 1, wherein the controller is configured to:
    determine a life metric of the traction battery based at least in part on the battery characteristic information; and
    produce the fuel cell power signal based at least in part on a combination of the fuel cell life metric and the battery life metric to maximize the operational life of the fuel cell and the operational life of the traction battery.

13. The system of claim 1, further comprising:
    the fuel cell controller module, and
    the battery controller module.

14. The system of claim 1, wherein the system is disposed onboard the vehicle.

15. A method for power-split control of a fuel cell electric vehicle including a fuel cell and a traction battery, the method comprising:
    obtaining a power demand based at least in part on an input from an operator of the fuel cell electric vehicle;
    determine a fuel cell power output and a battery power output, wherein the fuel cell power output in combination with the battery power output meets or exceeds the power demand;
    wherein the fuel cell power output is determined according to a battery charge sustaining mode while a convergence condition is not met and is determined according to a battery charge depletion mode while the convergence condition is met;

wherein the convergence condition is met when a historical average of the fuel cell power output approaches a steady state condition within upper and lower bounds;

wherein, in the battery charge sustaining mode, the fuel cell power output is determined based on a state of charge of the traction battery;

wherein, in the battery charge depletion mode, the fuel cell power output is determined based on the state of charge of the traction battery and based on a fuel cell life metric.

16. The method of claim 15, wherein the fuel cell life metric is a mathematical model of the remaining operational life of the fuel cell.

17. The method of claim 16, wherein in the battery charge depletion mode, the state of charge of the battery after a drive cycle is less than the state of charge of the battery before the drive cycle.

18. The method of claim 15, wherein in the battery charge sustaining mode, the state of charge of the battery after a drive cycle is equal to the state of charge of the battery before the drive cycle.

19. The method of claim 15, wherein in the battery charge sustaining mode, the fuel cell power demand is a product of the power demand and a gain function, the gain function being based on the measured state of charge of the battery relative to a nominal state of charge of the battery.

20. The method of claim 15, wherein in the battery charge depletion mode, the fuel cell power demand is a sum of an average power output of the fuel cell after the convergence condition is met and a product of a power delta and at least one gain function, wherein the power delta is equal to the power demand less the power output of the fuel cell, wherein the at least one gain function is based on the fuel cell life metric.

21. The method of claim 20, wherein the at least one gain function is based on an integral of the fuel cell life metric, the fuel cell life metric representing the operational life of the fuel cell.

22. The method of claim 15, further including:
  determining a life metric of the traction battery based at least in part on the battery characteristic information; and
  determining the fuel cell power signal based at least in part on a combination of the fuel cell life metric and the battery life metric to maximize the operational life of the fuel cell and the operational life of the traction battery.

* * * * *